Aug. 14, 1956  J. ESLINGER  2,758,409
FISH LURE WITH PORPOISE-LIKE ACTION
Filed May 19, 1953
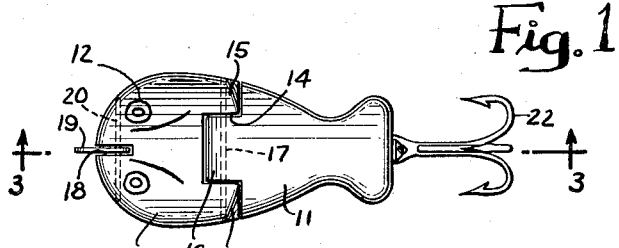
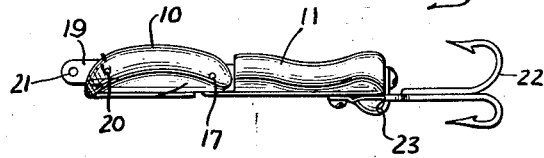
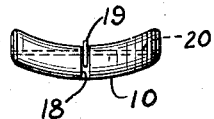
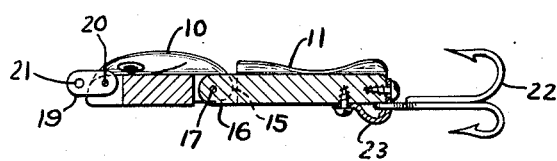
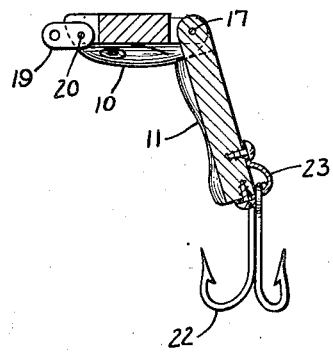
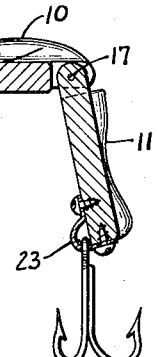
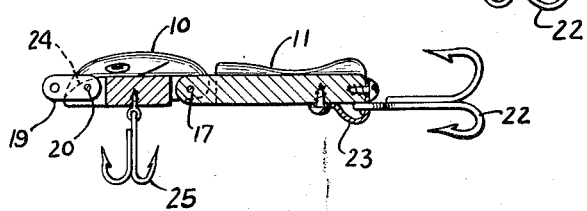
INVENTOR.
JOHN ESLINGER
BY
Carlson, Pitzner, Hubbard & Wolfe
attys.

2,758,409
FISH LURE WITH PORPOISE-LIKE ACTION
John Eslinger, Chicago, Ill.

Application May 19, 1953, Serial No. 355,957

3 Claims. (Cl. 43—42.15)

The present invention relates to an improved fish lure having vertical porpoise-like swimming movement when drawn through water. This animation is visible to fish from the side of the lure and thus effectively attracts attention.

It is the primary object of the invention to provide a fish lure of the above described type which requires no agitating spoons or the like to produce vertical, porpoise-like swimming movement; which is self-righting to ride horizontally with its top side uppermost and hooks hanging down properly from the bottom side, regardless of its original position when thrown into the water; and which may be simply manufactured, as well as being convenient and rugged in use.

Further objects and advantages will become apparent as the following description proceeds, taken in conjunction with the accompanying drawings, in which:

Figure 1 is a plan view of a fish lure embodying the present invention;

Fig. 2 is a side elevation of the lure shown in Fig. 1;

Fig. 3 is a longitudinal section taken along line 3—3 in Fig. 1;

Fig. 4 is a front elevation of the lure shown in Fig. 1;

Figs. 5 and 6 are vertical sections of the lure in upside-down and upright pivoted positions, respectively, which it might initially assume when cast into water; and Fig. 7 is a longitudinal section of fish lure embodying a modified form of the present invention.

It is not intended that the invention be limited to the details of the preferred illustrated embodiment, but rather that it include all modifications as defined within the spirit and scope of the appended claims.

In general, and as shown by the drawings, the present fish lure is formed of at least two body portions or sections, that is, a head section and a tail section, having transversely concave upper and convex lower surfaces, both of which are level in a longitudinal direction, i. e., have longitudinal center lines that are straight. Means are employed to vertically connect the two body sections in end-to-end tandem relation for relative rocking only about a single transverse axis. The broad surfaces of the pivoted portions cause them to assume horizontal orientation by virtue of a skiing effect when drawn through water by a line attached to the nose of the fore section. Horizontal and upright stability about the longitudinal axis is further enhanced by a dihedral effect resulting from a particular transversely curved configuration of the body portion to be explained presently. When the lure is drawn through water, however, velocity and pressure differentials set up relative vertical oscillatory movements between the body portions which simulate the action by which a porpoise swims. The top surfaces of the body portions are formed to be concave along their transverse dimension, with the result that the lure rides upright, regardless of its original position, as more fully explained below. The porpoise-like action and the self-righting effect are accomplished completely without the use of agitating spoons or specially located weights.

Referring now more particularly to Figs. 1 through 4, the illustrated fish lure includes, in keeping with the invention, a plurality of successive pivotally connected sections, shown in this instance as a head portion 10 and a tail portion 11, both being relatively thin as compared to their length and relatively broad as compared to their thickness. As shown by Fig. 1, the leading body section is broader than the trailing section, or more particularly, the head of section 10 has a portion that is substantially broader than any portion of the tail section 11. The edges of the body portions are preferably rounded to facilitate their smooth passage through water, and the top surfaces are transversely concave as shown most clearly in Fig. 4. The plan profile may take different forms, preferably a fish-like outline such as shown in this instance where the head and tail portions are shaped generally like those of a porpoise as viewed from above. Suitable eyes 12, scales or other markings may be attached, molded in, or painted on the body of the lure.

The head and tail portions are pivotally secured to one another in end-to-end tandem relation for relative swinging about a single transverse axis. As shown, the pivotal connection between the trailing edge of the head portion and the forward edge of the tail portion is formed to present a unitary body effect. A center slot 14 is defined in the head portion 10 by rearwardly extending side tabs or ears 15 and a forwardly projecting tongue 16 on the tail portion 11 is received in the slot. A pin 17 is inserted through registering holes in the tongue 16 and ears 15 to provide a transverse pivot axis. As the head and tail sections pivot relatively about the pin 17, a single break across the body of the lure does not result. Also, this pivot connection will not permit the head and tail portions to swing laterally relative to one another, but affords relative rocking only about the transverse axis defined by the pin 17.

The lure is adapted to be drawn through water by a line effectively attached to a link 19 which is secured to the head portion at a point aft of its leading edge. A longitudinal slot 18 is defined in the leading edge of the head portion and the connecting link 19 is pivotally secured in it by a transverse pin 20 extending through registering holes in the link 19 and head portion 10. The line may be tied through another hole 21 formed in the front end of the link. By this construction, the swimming action of the lure is accommodated without undue repetitive flexure of the line, the pivoting action of the link absorbing such movement and enhancing the relative vertical oscillations of the head and tail portions.

One or more hooks are attached to the body. Preferably, a triple hook 22 is swiveled on a small bracket 23 secured to the trailing edge of the tail portion, to readily engage the mouth of a fish attempting to swallow the lure. If desired, additional hooks may be placed at other locations on the lure.

The lure thus far described will seek a horizontal position when drawn through water, due to its broad surfaces. If it should originally be positioned with its broad surfaces vertically disposed, it will turn to a horizontal plane since much greater support or upward force is then exerted by an air foil type action with the water. In this horizontal position, the lure has a unique swimming action, the head and tail sections 10 and 11 oscillating or wiggling vertically with respect to one another with a rapidity related, just as in the case of a porpoise, to the speed of forward movement. This undulating animation is believed to be produced by action of Bernoulli's Principle, i. e., unequal water velocities and pressures acting along the upper and lower surfaces of each body portion, with the movement of each portion affecting the velocity distribution around the other portion so that the action is sustained. Nevertheless, the resulting swimming action resembles the supple, muscular undulations of a real fish, since no spoons or other agitators are required to produce it even when it is trolled or retrieved at a constant or uniform velocity.

Normally, in use with conventional bait casting, fly casting, spinning, or trolling equipment, there will be a slight upward force exerted by the line on link 19. The embodiment shown by Figs. 1 to 6 will, therefore, at normal fishing speeds, ride slightly below the surface of the water when upward and gravitational forces are balanced. However, as shown in Fig. 7, the leading edge or nose may be tapered at its upper side 24 to produce an additional downward force and cause the lure to be deep running, but with the same swimming action. Also, as shown in Fig. 7, extra hooks 25 may be attached to the underside of the head portion 10 without adversely affecting the swimming action.

While the lure described will normally seek a horizontal plane and exhibit the swimming action described, the difficulty of assuring that the lure will always ride upright has been overcome by forming the top surfaces of the body portions transversely concave, and the bottom surfaces transversely convex, as shown best by Fig. 4. With that transverse curvature, the upper and lower surfaces of the body sections are level in a longitudinal direction, i. e., they have longitudinal center lines that are straight, as will be evident from Fig. 3. It is necessary that the lure ride upright in the water regardless of its original position when thrown or cast, in order that the hooks 22 may be properly positioned for engaging the mouth of a fish and that the colorings of the lure, normally light on the underside and darker on the top side, may be properly positioned. The transverse concavity of the top surfaces assures that the lure is self-righting by creating a spoon effect which exists only so long as the lure is inverted. If the lure falls inverted in the water, as shown in Fig. 5, the tail section 11 drops due to its weight and the concave surfaces then form an inverted spoon, similar to an ordinary type fishing spoon. As is well known, when an ordinary fishing spoon is drawn through the water it tends to rotate about its longitudinal axis and the same principles apply to the present lure when in the position shown by Fig. 5. Thus, as the lure is drawn forward a turning force is created by the spoon effect. Once turned upright, however, the tail section again drops (Fig. 6) so that the spoon effect is removed and the lure does not tend to turn completely over. The swimming or porpoise-like action above described then begins and continues as the lure is drawn through the water, with no further spoon effect being created, which might tend to invert the lure, because during such action the tail portion 11 does not pivot above the head portion 10 sufficiently. In fact, the somewhat vertically inclined edge portions of the lure, resulting from the transverse concavity of the upper surfaces, create a vertical dihedral effect which tends to keep the lure stabilized in a horizontal position, much as vertically inclined wings on an airplane keep it properly balanced. By reason of the concave shaping or transverse curvature of the upper body surfaces as described, therefore, the lure is made self-righting without the use of special weights or stabilizing devices and will always ride upright in the water with the hooks properly disposed and with the porpoise swimming action described.

I claim as my invention:

1. A fish lure having porpoise-like swimming action comprising head and tail body sections which are relatively thin as compared to their length and relatively broad as compared to their thickness, said sections each having smooth transversely concave upper and convex lower surfaces both of which have longitudinal center lines that are straight, said head section having a portion that is substantially broader than any portion of said tail section, and means for pivotally connecting said sections in end-to-end tandem relation for relative rocking of the same only about a single transverse axis, so that the lure automatically turns and remains right-side-up and said sections have an undulating, relative up-and-down motion when drawn through water by a line attached to said head section.

2. A fish lure comprising head and tail body sections, which are relatively thin as compared to their length and relatively broad as compared to their thickness, said sections each being shaped to have broad, transversely concave upper and convex lower surfaces both of which have longitudinal center lines that are straight, said head section having a portion that is substantially broader than any portion of said tail section, means for pivotally connecting said sections in end-to-end tandem relation for relative rocking of the same only about a single transverse axis, and a short flat link pivoted aft of the leading edge of said head section for rocking about a transverse axis, said link extending forwardly beyond said leading edge and being adapted to receive a line for drawing the lure through water, whereupon the lure remains right-side-up and the sections have relative undulating, up-and-down movement simulating the swimming of a porpoise.

3. A fish lure comprising head and tail sections relatively thin compared to their length and relatively broad compared to their thickness, said sections each having transversely concave upper and convex lower surfaces both of which have longitudinal center lines that are straight, said head section having a portion that is substantially broader than any portion of the tail section, means for pivotally connecting said sections in end-to-end tandem relation for relative rocking of the same only about a single transverse axis, at least one fish hook fixed to one of said sections and depending beneath said lower, convex surfaces, and means connected aft of the leading edge of said head section and adapted to receive a line to draw the lure through water, whereupon the lure automatically turns right-side-up regardless of its initial position in the water and the sections have relative up-and-down undulating movement.

References Cited in the file of this patent

UNITED STATES PATENTS

| | | |
|---|---|---|
| Re. 16,636 | Skelly et al. | May 24, 1927 |
| D. 158,871 | Koski | June 6, 1950 |
| 1,540,702 | Morriss | June 2, 1925 |
| 1,854,024 | Farley | Apr. 12, 1932 |
| 1,997,900 | Edwards | Apr. 16, 1935 |
| 2,032,819 | Tengel | Mar. 3, 1936 |
| 2,334,792 | Royston | Nov. 23, 1043 |
| 2,556,533 | Graaten | June 12, 1951 |
| 2,618,092 | Hinkle | Nov. 18, 1952 |